324-77
CROSS REFERENCE SEARCH ROOM

Nov. 16, 1965 S. P. APPLEBAUM 3,218,559
SYNCHRONIZING CIRCUIT MAINTAINING LOOP SIGNALS
AS AN INTERGER PRODUCT AND EQUAL AMPLITUDE
Filed Nov. 9, 1961 2 Sheets-Sheet 1

INVENTOR:
SIDNEY P. APPLEBAUM,
BY Walter C. Bernkopf
HIS ATTORNEY.

INVENTOR:
SIDNEY P. APPLEBAUM,
BY Walter C. Bernkopf
HIS ATTORNEY.

United States Patent Office 3,218,559

Patented Nov. 16, 1965

3,218,559

SYNCHRONIZING CIRCUIT MAINTAINING LOOP SIGNALS AS AN INTEGER PRODUCT AND EQUAL AMPLITUDE

Sidney P. Applebaum, Liverpool, N.Y., assignor to General Electric Company, a corporation of New York Filed Nov. 9, 1961, Ser. No. 151,301
9 Claims. (Cl. 328—15)

This invention relates to a synchronizing circuit for controlling frequency and amplitude variations in an electronic circuit. More particularly, the invention relates to such a synchronizing circuit employed to control a plurality of discrete frequency displaced signals generated by an associated circuit so as to maintain equal signal amplitudes and equal increments of frequency displacement between such signals, where such frequency increments have a predetermined relation to a parameter of the associated circuit.

It is frequently desirable in the electrical art to identify and control the relative amplitudes and phases of a number of discrete signal components separated by equal increments of frequency, such as signals having a plurality of sidebands displaced about a center frequency. An example of circuitry utilizing such signals is disclosed in the applicant's co-pending application entitled "Spectrum Analyzer," Serial No. 712,282 filed on January 30, 1958, and now Patent Number 2,997,650. That patent, which is hereby incorporated by reference, discloses an arrangement where an input signal is successively time delayed by equal increments of time delay and frequency shifted by equal increments of frequency in a re-circulating closed loop system. For normal operation it is desirable that the resulting discrete frequency and time displaced signals have a constant amplitude and a constant increment of frequency that is equal to an integer divided by the time delay of the loop system. This requires that both the gain around the closed loop and the scanning frequency be precisely adjusted. Although both loop gain and scanning frequency can be adjusted with reasonable stability on an open-loop basis, maximum stability under adverse environmental conditions can be obtained by a synchronizing circuit which continuously and automatically adjusts both of these parameters. A synchronizing circuit capable of performing this function is disclosed in the co-pending application entitled "Measuring Circuit," Serial No. 713,053, filed on February 3, 1958, by P. W. Howells and M. J. Dominguez, now Patent No. 3,060,380. The latter application discloses arrangements for synchronous quadrature and in-phase detection of an incoming signal so as to provide error signals representative respectively of the amplitude difference and the phase difference of adjacent sidebands in respect to the center frequency.

It is an object of the present invention to provide an improved arrangement for detecting the difference in amplitude between discrete frequency displaced signal components by employing a minimum of active circuit components.

It is another object of the present invention to provide an improved arrangement for detecting the product of the time delay of the associated loop system and the frequency displacement between the signal components employing a minimum active circuit component.

It is still another object of this invention to provide an improved arrangement for utilizing the desired amplitude difference and a derived measure of the product of loop time delay and frequency displacement to maintain equal amplitudes and to maintain a constant integer value of the product of time delay and frequency displacement.

It is a still further object of this invention to employ passive components to detect symmetrical deviation from linear phase shift in the output signal spectrum of the spectrum analyzer disclosed in the applicant's above referenced application.

In carrying out the invention in one embodiment thereof, an input signal, having a plurality of discrete components displaced by frequency increments corresponding to a predetermined frequency, is applied in parallel through a plurality of filters. Each of these filters have substantially equal passbands located at different center frequencies which are displaced by an integral of the predetermined frequency. The outputs of the filters are compared together, for instance multiplied, to produce an output signal which is a function of the deviation of the product of the time delay of the associated loop system and the frequency displacement between the signal components from a predetermined integer constant and which may be employed to control the source of predetermined frequency. The output of the filters may be suitably processed, prior to comparison, by envelope detectors and by second filters having a passband corresponding to the predetermined frequency. The output of the first named filters may also be combined in a subtraction circuit to provide a signal that is a measure of the amplitude difference between signal components displaced by an integer multiple of the predetermined frequency. This signal may be employed to control the gain of the source of input signals. Alternatively gain may be controlled by a discriminator circuit.

The novel features characteristic of the invention are set forth with particularity in the appended claims. The invention itself, however, together with further objects and advantages thereof can best be understood by reference to the following description taken in connection with accompanying drawings in which:

Figure 1:
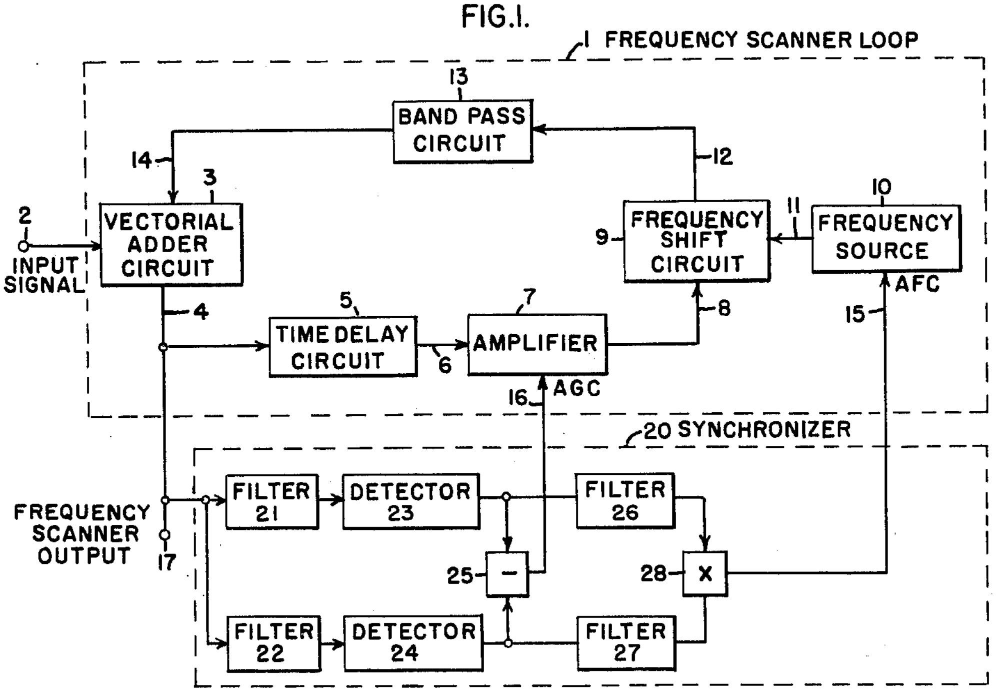
FIG. 1 is a block diagram of one embodiment of the invention illustrating the application of synchronizing circuitry to a re-circulating frequency scanner loop for controlling the amplitude and the frequency increments of the signals circulating therein.
Figures 2A, 2B:
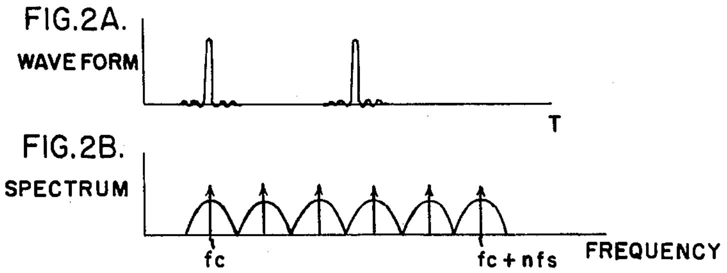
FIG. 2 is a diagram illustrating selected waveform and frequency spectrum information representative of the circuit of FIG. 1.

Turning now to the drawings, in FIG. 1, there is illustrated a block diagram of a frequency scanner loop 1 with an associated synchronizer 20 for properly maintaining the loop frequency and gain. The frequency scanner loop, which is of the type described in the referenced Patent No. 2,997,650, has a signal, which is to be re-circulated in the loop circuit, applied to input 2 of the adder circuit 3. The output of the adder circuit is coupled through line 4, the time delay circuit 5, line 6, amplifier 7, line 8, frequency shift circuit 9, line 12, bandpass circuit 13, and is returned through line 14 to another input of adder circuit 3. Summation outputs of the re-circulated signals are obtained from line 4, at frequency scanner output 17. An input signal which is applied to the loop thus continues to circulate through the above described loop, being delayed in time by the delay circuit 5, and being frequency shifted in the shift circuit 9 by the signal frequency from source 10 during each circulation. A bandpass circuit 13 operates to limit the total number of circulations, since the re-circulated signal will eventually be shifted to a frequency outside of the passband of circuit 13. Thus for example if the input signal frequency $f_c$ is 30 megacycles, the scanning frequency $f_s$, is 0.5 megacycle, and the bandpass filter has a frequency cutoff at 38 megacycles, the frequency scanner output will consist of a simple family of spectrum lines separated by 0.5 megacycle and extending from 30 to 38 megacycles. As illustrated in FIG. 2B this corresponds to a range from $f_s$ to $f_c+nf_s$, where $n$ corresponds to the number of loop circulations. Satisfactory operation of this loop circuit requires careful control of the loop gain and of the frequency by which the re-circulating signal is shifted in the frequency shift circuit 9. A synchronizing circuit 20 whose input is supplied from line 4 accordingly provides an automatic gain control signal over line 16 to amplifier 7 to regulate the loop gain and additionally provides an automatic frequency control signal over line 15 to frequency source 10 so as to regulate the frequency by which the re-circulating signal is shifted.

Figures 3A, 3B:
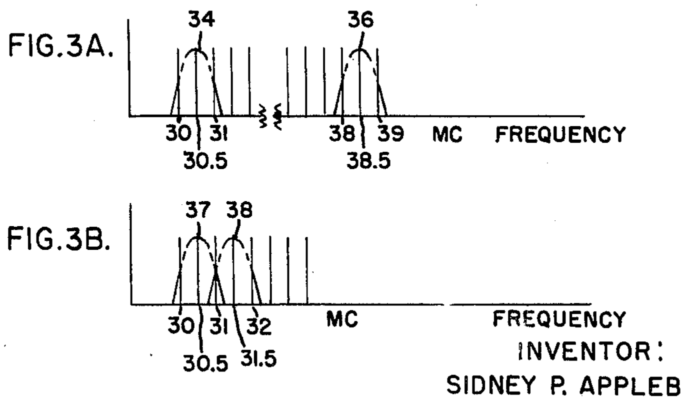
FIG. 3 is a diagram of a signal spectrum and filter passbands to a common frequency base in which signal amplitude and filter discrimination are plotted along the axis of ordinates and frequency is plotted along the axis of abcissa.

The synchronizing circuit comprises two filters 21 and 22 whose inputs are connected in parallel to line 4 of the frequency scanner loop. Filters 21 and 22 have different center frequencies but preferably have identical passband characteristics. The center frequencies of the filters should be separated by an integer multiple of the scanning frequency of source 10 and lie within the loop passband. As an example, the center frequencies may coincide with certain spectrum lines of the input signal and the passband of each filter may, for example, comprise the filter center frequency plus or minus $f_s$ shaped so that rejection at plus or minus $f_s$ is approximately twice that at the respective center frequency. For example, as illustrated in FIG. 3A, filter 21 may have a passband 34 with a center frequency of 30.5 mc. and 50% amplitude attenuation respectively at 30 and 31 mc. The outputs of filters 21 and 22 are respectively applied to envelope detectors 23 and 24. The outputs of the detectors are applied to a subtraction circuit 25, whose output signal, the automatic gain control signal, is coupled on line 16 to amplifier 7. The outputs of detectors 23 and 24 are additionally applied, respectively, through filters 26 and 27, to a multiplication circuit 28. The filters 26 and 27 provide a 90° phase shift between the outputs of detectors 23 and 24, and may optionally reject the harmonic frequencies, except for the fundamental of the detector output signals. The output of multiplier 28 constitutes the automatic frequency control voltage which is coupled by line 15 to the frequency source 10 so as to control the output frequency of the latter. The multiplier may include a "box car" or equivalent integrating amplifier to increase loop gain, particularly when the input signals to the synchronizer are not applied continuously.

Operation of the circuit of FIG. 1 can be given in more detail as follows. As is described in the referenced Patent No. 2,997,650, the frequency scanner loop performs coherent integration of input pulse signals. This is accomplished by delaying the loop signal during each recirculation in the delay line circuit 5, by a time which matches the repetition rate of the input signal pulse train applied from line 2 so that after $n$ recirculations, $n$ input pulses will emerge simultaneously at the output 17. By the action of the frequency shift circuit 9, each pulse will have been frequency shifted a different number of times so that the delayed loop output spectrum consists of a family of pulse spectra spaced by the scanning frequency $f_s$, as illustrated in FIG. 2B. If the input is a continuous wave signal $f_c$, the output spectrum consists of a simple family of lines which correspond to the family of continuous pulse spectra. Ideally, these lines should have a linear phase relation, in which the phase difference between adjacent lines is proportional to the input frequency $f_c$. With this linear phase relation the family of lines forms a repetitive $$\frac{\sin x}{x}$$

pulse train recurring at the scanning frequency $f_s$ as illustrated in FIG. 2A. The time position of the pulses depends upon the linear phase slope of the loop signal and is thus a function of the input frequency. Thus if the time base of FIG. 2A is synchronized to the scanning frequency $f_s$, the pulse peaks will vary in time position linearly with the frequency of the input signal, so that the frequency of the input signal is detected as a time position of the output signal. Maximum frequency resolution is thus obtained when the pulses illustrated in FIG. 2A are of minimum width. For a given number of signal re-circulations in the loop this requires that the scanner output signal have, (1) a flat output pulse spectrum, which can be achieved by maintaining a unity loop gain, and, (2) a linear phase relation.

An analysis of the frequency scanner loop demonstrates the requirements of the synchronizer. Assuming a pure sinusoidal input signal of form $E \cos 2\pi f_c t$ where:

$E$=maximum amplitude in volts
$f_c$=frequency of the input signal in cycles per second
$t$=time in seconds The signal after one circulation in the scanner will, ignoring constant phase terms, be:

$$e_1=EC \cos 2\pi[f_c(t-T)+f_s t] \quad (1)$$

Where $C$=loop gain
$T$=delay circuit time in seconds
$f_s$=scanning source frequency Similarly the signal after two circulations will be:

$$e_2=EC^2 \cos 2\pi[f_c(t-2T)+2f_s t-f_s T] \quad (2)$$

and after three circulations will be:

$$e_3=EC^3 \cos 2\pi[f_c(t-3T)+3f_s t-3f_s T] \quad (3)$$

after $k$ circulations the signal will be:

$$e_k=EC^k \cos 2\pi\left[f_c(t-kT)+kf_s t-\frac{k^2-k}{2}f_s t\right] \quad (4)$$

The summation signal output at scanner output terminal 17 written in polar form after $k$ circulations, will be:

$$e_{out}=\sum_{k=0}^{n-1} EC^k \exp.\ j2\pi\left[f_c(t-kT)+kf_s t-\frac{k^2-k}{2}f_s T\right] \quad (5)$$

where $n$ is the total number of signal output components. From Equation 5 it may be seen that all phase terms are linear with respect to the index $k$ with the exception of the non-linear phase term $$\left(\frac{k-1}{2}\right)kf_s T$$

This term is introduced because the carrier frequency signal, from frequency source 10, re-circulates through the time delay circuit 5.

The non-linear phase term can be separated into a linear and square law component. Since the linear phase terms in Equation 5 merely imply a simple time shift of the output, it can be further simplified by a change of time reference to:

$$e_{out}=\sum_{k=0}^{m-1} EC^k \exp.\ j2\pi\left[(f_c+kf_s)t-\frac{k^2}{2}f_s T\right] \quad (6)$$

The square law component $$\frac{k^2}{2}f_s T$$

unless eliminated will disperse the output pulses and decrease the frequency resolution of the system. It is, therefore, desirable to effectively eliminate the square law component by locking the scanning frequency to the loop delay so that the product of the delay T and the scanning frequency $f_s$ is an integer. The synchronizer, therefore, must detect any square law component in the frequency scanner loop and must develop an automatic frequency voltage to eliminate this component. Additionally the synchronizer must detect any deviation from unity loop gain and must develop an automatic gain control signal to eliminate such deviation.

The synchronizer illustrated in FIG. 1 performs the above described functions in the following manner. The frequency scanner loop signal is applied to filters 21 and 22 so that the output of each filter will be the product of the frequency scanner loop signal and the transfer function of the filter. Filters 21 and 22 have transfer functions that are identical except as to their center frequencies thus having identically shaped bandpass characteristics about their respective center frequencies. The bandpass frequencies of each filter are within the bandpass of the frequency scanner loop. The center frequencies of the filters are displaced by a multiple of the scanning frequency, and may be selected as $f_c+pf_s$ and $f_c+qf_s$, respectively, where $p$ and $q$ are different integers and $p$ is less than $q$. It can be shown that under these conditions, the output of filter 21 will be:

$$V_1(t)=\sum_{k=0}^{n-1}C^k h_{k-p} \exp. j2\pi\left\{(f_c+kf_s)t-\frac{k^2}{2}f_sT\right\} \quad (7)$$

where $h_l$=transfer function of filter 21 (or filter 22), at the frequency $lf_s$ above center frequency. Equation 7 may be rewritten as:

$$V_1(t)=C^p \exp. j2\pi\left[(f_c+pf_s)t-\frac{p^2}{2}fT\right]$$

$$\sum_{k=0}^{n-1}C^{k-p}_{h_l} \exp. j2\pi\left[(k-p)f_s(t-pT)-\frac{(k-p)^2}{2}f_sT\right] \quad (8)$$

The envelope of $V_1(t)$ will be:

$$E_1(t)=C^p|u(t-pT| \quad (9)$$

where:

$$u-(t)\sum_{l=-p}^{n-1-p}C^l h_l \exp. j2\pi\left[lf_st-\frac{l^2}{2}f_sT\right] \quad (10)$$

Similarly the output of filter 22 will have the following envelope:

$$E_2(t)=C^q|v(t-qT)| \quad (11)$$

where:

$$v(t)=\sum_{l=-q}^{n-1-q}C^l h_l \exp. j2\pi\left[lf_st-\frac{l}{2}f_sT\right] \quad (12)$$

If the filters are designed so that $h$ is negligible for $l$ greater than an integer M, where M≦the lesser of $p$ and $n-1-q$, then the following approximation holds:

$$v(t)=u(t)\approx\sum_{l=-M}^{M}C^l h_l \exp. j2\pi\left[lf_st-\frac{l^2}{2}f_st\right] \quad (13)$$

With these conditons, the envelopes of the filter outputs will be related as follows:

$$E_2(t)=C^{q-p}E_1[t-(q-p)T] \quad (14)$$

Equation 14 illustrates that the envelopes are identical except for a time delay and amplitude factor. To obtain frequency synchronizing information it is necessary to determine from $E_1$ and $E_2$ the relation between $f_s$, the scanning frequency and T, the loop delay. From Equations 9 and 10 it may be seen that $E_1(t)$ is a periodic function with a fundamental frequency of $f_s$. In general, therefore, $$E_1(t)=\sum_r d_r \exp. j2\pi rf_st \quad (15)$$

and $$E_2(t)=\sum_r d_r \exp. j2\pi rf_s(t-aT) \quad (16)$$

where $d_{-r}$=conjugate of $d_r$ and $a=q-p$.

When $E_1(t)$ is passed through a network which removes the direct current component and shifts all harmonics by 90°, it becomes $$E_1'(t)=\sum_{r=1}^{\infty}\left[d_r \exp. j2\pi\left(rf_st-\frac{\pi}{2}\right)+ d_{-r} \exp. -j2\pi\left(rf_st-\frac{\pi}{2}\right)\right] \quad (17)$$

If $E_2(t)$ is then multiplied by $E_1'(t)$ and averaged, the result will be:

$$E=\overline{E_2(t)\times E_1'(t)}=2\sum_{r=1}^{\infty}|d_r|^2 \sin 2\pi arf_sT \quad (18)$$

From Equation 18 it may be seen that voltage E may be used as an error voltage to determine the synchronizing frequency $f_s$. As discussed above the frequency scanner loop operation requires that the product $f_sT$ must be an integer. From Equation 18 it can be seen that when $f_sT$ is an integer, E will be zero and that when $f_sT$ is not an integer E will have a magnitude and sign indicative of the deviation and may thus be employed as an error signal to control the scanner frequency output from frequency source 10.

The frequency control action of the system can be analyzed in reference to FIG. 3A which illustrates a typical spectrum of the frequency scanner loop having a 30 megacycle input signal and additional spectral lines separated by 0.5 megacycle, the frequency of source 10. Dashed lines 34 and 36, respectively, represent the bandpass characteristics of filters 21 and 22. The bandpass characteristics, in this example, are selected so as to encompass one central spectral line which is equivalent to a carrier frequency signal and one spectral line adjacent to each side of the central line, which is equivalent to a sideband signal. In the illustrated example the filter transfer function is shaped so that the amplitude response at the sideband lines is less than one-half that of the central line. The outputs of envelope detectors 23 and 24 thus each represent sinusoidal modulation envelopes of less than 100% modulation. If the frequency scanner loop signal contains only linear phase terms, the outputs of filters 21 and 23 will have an identical phase slope. However, if the scanner loop signal contains a square law component of $f_sT$, the outputs of the two filters will have a different phase slope. There will, therefore, be a time shift in the modulation envelopes at the outputs of detectors 23 and 24. The automatic frequency control signal is thus obtained by phase detecting the outputs of the two detectors. This is accomplished by phase shifting one of the detector outputs by 90° and subsequently multiplying the outputs. Thus the output of detector 23 is phase shifted by phase shifter 26 and multiplied by multiplier 28 to provide the automatic frequency control signal. The phase measurement is relatively uneffected by system gain.

The scanner loop gain is controlled by an automatic gain control signal obtained by subtracting the outputs of envelope detectors 23 and 24 in subtraction circuit 25. If the loop gain deviates from unity there will be an exponential change in signal amplitude. Thus with a loop gain less than unity there will be a decay in the signal amplitude, so that the lower frequency signals of the loop will have higher amplitudes than the higher frequency signals, since the latter represent input signals first introduced into the system.

The filter transfer functions illustrated in FIG. 3A have center frequencies that are substantially separated in the scanner loop frequency domain. Although such separation increases the sensitivity of the synchronizer, it may introduce problems due to ambiguous lock-on points for the frequency control loop circuits. FIG. 3B illustrates filter transfer functions 37 and 38 whose center frequencies are not as widely separated. The center frequencies should be separated by an integer of the scanning frequency, but, subject to proper shaping of the filters, there is no other limitation as to the separation of the center frequencies.

It is of course evident that the synchronizer circuit may in some applications be utilized only intermittently. Thus if the input signal to the scanner loop is not applied continuously, a special test signal may be applied during intervals when no input signal is applied. The synchronizer may be gated so as to be operative only during application of such a test signal and the synchronizer gain and frequency signal outputs may be stretched to endure until the succeeding test pulse is applied.

Figure 4:
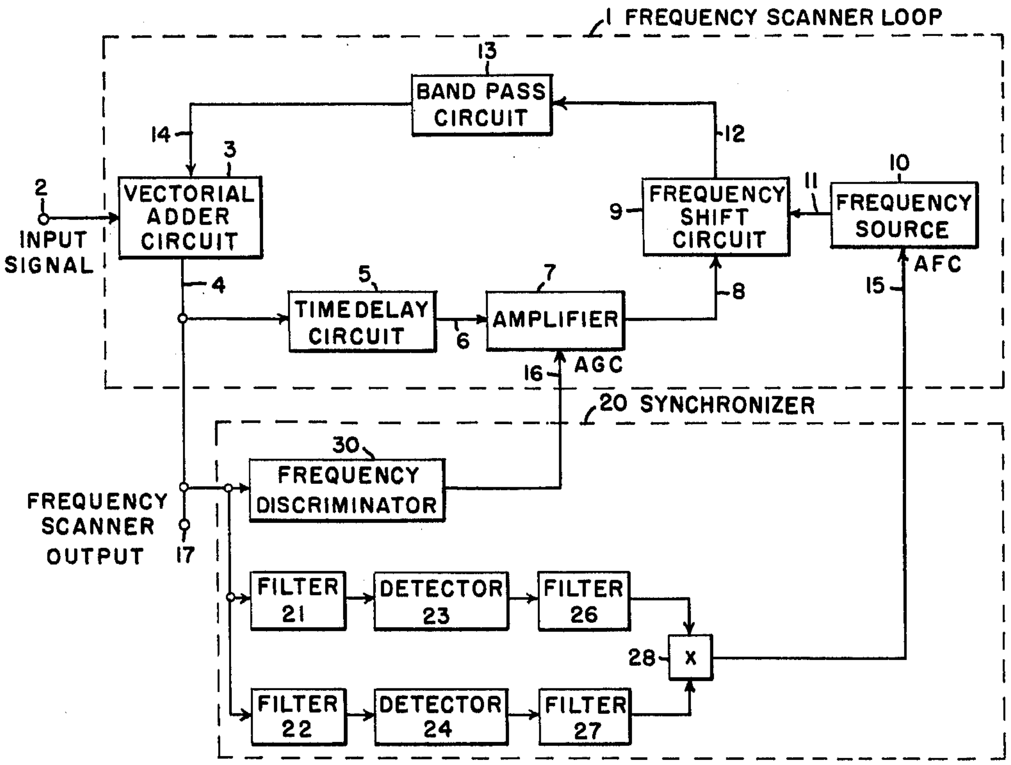
FIG. 4 is a block diagram of another embodiment of the invention.

FIG. 4 illustrates a modification of the synchronizer automatic gain control circuit. In this modification the frequency scanner output signal, from line 4, is applied to frequency discriminator 30, in addition to being applied to filters 21 and 23. The output of the discriminator comprises the automatic gain control signal which is applied over line 16 to amplifier 7. In this embodiment the discriminator is employed in lieu of the subtraction circuit 25, illustrated in FIG. 1.

Operation of the gain control circuit of FIG. 4 is based on a comparison of loop energy. Whereas the gain control circuit of FIG. 1 was based on measuring the energy difference of two discrete samples separated in frequency, the circuit of FIG. 4 determines the frequency location of the average loop energy. The discriminator has a bandpass extending over a substantial portion of the scanner loop bandpass. If the scanner loop has unity gain the energy content of the earlier input signals, i.e. the low frequency components of the signal, will be identical to the energy content of the latter input signals, i.e. the high frequency components, and the discriminator will have a null output. A variation in loop gain will accordingly shift the frequency of the average energy content and will thus result in a discriminator output whose polarity and amplitude will correct the loop gain.

While the principals of the invention have now been made clear by the illustrative embodiments, there will be immediately obvious to those skilled in the art many modifications in structure, arrangement, proportions, elements, components used in the practice of the invention, and otherwise, which are particularly adapted for specific environments and operating requirements without departing from these principles. The appended claims are therefore intended to cover and embrace any such modification, within the limits only of the true spirit and scope of the invention.

What I claim as new and desire to secure by Letters Patent of the United States is:

1. A system for measuring non-linear phase components in a signal spectrum comprising a source of signals having a plurality of spectral line components displaced by a substantially equal frequency increment and by a substantially equal time increment, first and second filters connected to said source, the center frequencies of said first and second filters being displaced by an integer product of said frequency increment, means for detecting the phase difference between the signal outputs of said filters and means for connecting said detecting means to said source to maintain the product of said frequency increment and said time increment as an integer.

2. A system for measuring non-linear phase components in a signal spectrum comprising, a source of signals having spectral lines, each of said lines being displaced from its adjacent line by a substantially equal frequency increment and by a substantially equal time delay increment, first and second filter means connected to said source, the center frequencies of said first and second filter means being displaced by an integer product of said frequency increments, said filter means having an identical bandpass characteristic when referred to their respective center frequencies, first and second envelope detection means connected respectively to the outputs of said first and second filter means, 90° phase shifting means and multiplying means serially connected to the outputs of said first and second envelope detecting means.

3. A system for detecting an even symmetrical phase deviation in the phase components of a signal spectrum comprising, a source of signals having spectral lines, each of said lines being displaced from its adjacent line by a substantially equal frequency increment and by a substantially equal time delay increment, first and second filter means connected to said source, the center frequencies of said first and second filter means being displaced by an integer product of said frequency increment, said filter means having an identical bandpass characteristic when referred to their respective center frequencies, said characteristic being shaped so as to produce an output signal corresponding to a complex modulated wave having a modulation index less than 100%, means to detect the modulation envelopes of said filters, and means to detect the phase differences between said modulation envelopes.

4. A sensing system comprising, a plurality of filters, means to supply a signal having a predetermined repetition rate to said filters, said filters having center frequencies displaced by an integer product of said repetition rate, envelope detection means connected to the output of each of said filters, means for detecting an even symmetrical phase deviation in said signal comprising 90° phase shifting means and multiplying means serially connected to the outputs of said envelope detection means.

5. A sensing system comprising, input means adapted for connection to a source of signals having a plurality of spectral lines displaced by a substantially equal increment of frequency, a first and a second filter connected to said source, the center frequencies of said first and second filter being displaced by an integer product of said increment of frequency, means to compare the outputs of said filters to obtain a representation of the amplitude difference of said spectral lines and means to connect the output of said comparison means to said source to maintain the amplitudes of the spectral lines of said signal substantially uniform.

6. A sensing circuit comprising, input means adapted for connection to a source of signals having a plurality of spectral lines displaced by a substantially equal time increment, first and second filters connected to said input means, the center frequencies of said first and second filters being displaced by an integer product of said frequency increment, means for algebraically subtracting the outputs of said first and second filters to obtain a representation of the amplitude difference in said spectral line components, means for detecting the envelope outputs of said first and second filters and means to detect the phase difference between said envelopes.

7. A sensing circuit comprising, input means adapted for connection to a source of signals having a plurality of spectral lines displaced by a substantially equal frequency increment and by a substantially equal time increment, first and second filters connected to said input means, the center frequencies of said first and second filters being displaced by an integer product of said frequency increment, said filters having an identical bandpass characteristic when referred to their respective center frequencies, means for algebraically subtracting the outputs of said first and second filters to obtain a representation of the amplitude difference in said spectral line components, first and second envelope detecting means connected respectively to the outputs of said first and second filters, 90° phase shifting means and multiplying means being connected serially to the outputs of said first and second envelope detecting means, said multiplying means providing an output signal responsive to even symmetrical phase deviations in said signal.

8. A source of signals comprising, a band of spectral lines displaced by a substantially equal frequency increment and by a substantially equal time increment, a control circuit for said source to maintain a constant signal amplitude and to maintain the product of said frequency increment and said time increment as an integer comprising, first and second filters connected to said source, the center frequencies of said filters being displaced by an integer product of said frequency increment, said filters having an identical bandpass characteristic when referred to their respective center frequencies, algebraically subtraction means connected to the outputs of said first and second filters, means for connecting the output of said subtraction means to said source for maintaining the amplitudes of the spectral lines of said signal substantially equal, first and second envelope detection means respectively connected to the outputs of said first and second filters, 90° phase shifting means and multiplying means serially connected to the outputs of said first and second detectors, means for connecting the output of said multiplying means to said source to maintain the product of said frequency increment and said time increment as an integer.

9. A source of signals comprising, a band of spectral lines displaced by a substantially equal frequency increment and by a substantially equal time increment, a control circuit for said source to maintain a constant signal amplitude and to maintain the product of said frequency increment and said time increment as an integer comprising, first and second filters connected to said source, the center frequencies of said filters being displaced by an integer product of said frequency increment, means to detect the time differences of the signal envelopes passed by said filters, means to connect said detection means to said source to maintain the product of said frequency increment and said time increment as an integer, frequency discrimination means, means to connect said source to the input of said frequency discrimination means, means to connect the output of said frequency discrimination means to said source to maintain a substantially constant amplitude of said spectral lines.

References Cited by the Examiner

UNITED STATES PATENTS

| | | | |
|---|---|---|---|
| 2,240,428 | 5/1941 | Travis | 325—417 |
| 2,582,668 | 1/1952 | Bailey | 331—25 |
| 2,607,007 | 8/1952 | Clark | 328—137 |
| 3,017,505 | 1/1962 | Clapp | 328—149 |

ARTHUR GAUSS, *Primary Examiner.*

GEORGE N. WESTBY, *Examiner.*